(12) United States Patent
Chen

(10) Patent No.: US 10,802,442 B2
(45) Date of Patent: Oct. 13, 2020

(54) HOLOGRAPHIC DISPLAY DEVICE AND DRIVING METHOD THEREOF, AND DISPLAY CABINET

(71) Applicant: BOE TECHNOLOGY GROUP CO., LTD., Beijing (CN)

(72) Inventor: Hao Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 262 days.

(21) Appl. No.: 15/956,234

(22) Filed: Apr. 18, 2018

(65) Prior Publication Data

US 2018/0307182 A1    Oct. 25, 2018

(30) Foreign Application Priority Data

Apr. 19, 2017    (CN) .......................... 2017 1 0260444

(51) Int. Cl.

| G03H 1/22 | (2006.01) |
| G03H 1/12 | (2006.01) |
| G03H 1/26 | (2006.01) |
| G03H 1/08 | (2006.01) |
| G03H 1/02 | (2006.01) |

(52) U.S. Cl.
CPC ......... G03H 1/2294 (2013.01); G03H 1/0808 (2013.01); G03H 1/12 (2013.01); G03H 1/2286 (2013.01); G03H 1/265 (2013.01); G03H 2001/0212 (2013.01); G03H 2222/34 (2013.01)

(58) Field of Classification Search
None
See application file for complete search history.

(56) References Cited

U.S. PATENT DOCUMENTS

| 2005/0052717 A1* | 3/2005 | Brotherton-Ratcliffe ................... G03H 1/268 359/15 |
| 2009/0296176 A1* | 12/2009 | Leister ................. G03H 1/2286 359/9 |
| 2010/0046049 A1* | 2/2010 | Kroll ........................ G03H 1/02 359/9 |
| 2011/0149018 A1* | 6/2011 | Kroll ........................ G03H 1/02 348/40 |

(Continued)

FOREIGN PATENT DOCUMENTS

| CN | 103365196 A | 10/2013 |
| CN | 105005191 A | 10/2015 |
| CN | 105487244 A | 4/2016 |

*Primary Examiner* — Jennifer D. Carruth
(74) *Attorney, Agent, or Firm* — McDermott Will & Emery LLP

(57) ABSTRACT

A holographic display device is provided, comprising a spatial light modulator. The spatial light modulator is configured to load at least one composite hologram, and one of the at least one composite hologram is formed by superposing N sub-holograms. The holographic display device further comprises a light source arranged on a light incoming side of the spatial light modulator. The light source is configured to provide readout light to the spatial light modulator. The light source comprises M light source components. The direction of propagation of emergent light of each of at least two light source components among the M light source components is identical to the direction of propagation of a reference wave corresponding to one of the N sub-holograms, wherein M≥N≥2, and M and N are positive integers.

20 Claims, 8 Drawing Sheets

(56) References Cited

U.S. PATENT DOCUMENTS

| | | | |
|---|---|---|---|
| 2013/0016410 A1* | 1/2013 | Futterer | G02B 5/32 |
| | | | 359/15 |
| 2015/0378307 A1 | 12/2015 | Zheng et al. | |
| 2016/0004219 A1* | 1/2016 | Leister | G02B 5/32 |
| | | | 359/9 |
| 2016/0327906 A1* | 11/2016 | Futterer | G02F 1/133553 |
| 2017/0138851 A1* | 5/2017 | Ashrafi | G01N 33/487 |
| 2019/0129360 A1* | 5/2019 | Karthaus | F21S 41/147 |
| 2019/0271942 A1* | 9/2019 | Futterer | G03H 1/0248 |
| 2019/0391377 A1* | 12/2019 | Stoppe | G02B 21/125 |

\* cited by examiner

HOLOGRAPHIC DISPLAY DEVICE AND DRIVING METHOD THEREOF, AND DISPLAY CABINET

CROSS-REFERENCE TO RELATED APPLICATIONS

The present application claims priority to Chinese Patent Application No. 201710260444.2, filed on Apr. 19, 2017, titled "HOLOGRAPHIC DISPLAY DEVICE AND DRIVING METHOD THEREOF, AND DISPLAY CABINET", which is incorporated herein by reference in its entirety.

TECHNICAL FIELD

The present disclosure relates to the technical filed of display, and in particular to a holographic display device and a driving method thereof, and a display cabinet.

BACKGROUND

With the increasing popularization and application of the 3D (3-dimensional) display technology, the holographic display technology has gradually entered people's life and work. Unlike the parallax-based stereoscopic display technology, the holographic display technology has many advantages such as large depth of field, no dizziness and the like.

SUMMARY

In one aspect of the present disclosure, an embodiment of the present disclosure provides a holographic display device, including a spatial light modulator, wherein the spatial light modulator is configured to load at least one composite hologram, and one of the at least one composite hologram is formed by superposing N sub-holograms. The holographic display device further includes a light source arranged on a light incoming side of the spatial light modulator, the light source being configured to provide readout light to the spatial light modulator; and, the light source includes M light source components, the direction of propagation of emergent light of each of at least two light source components among the M light source components being identical to the direction of propagation of a reference wave corresponding to one of the N sub-holograms, wherein $M \geq N \geq 2$, and M and N are positive integers.

Optionally, the holographic display device further includes a driver and a controller having the at least one composite hologram stored therein. The controller is connected to the driver, and configured to acquire, from the at least one composite hologram, the direction of propagation of a reference wave corresponding to each sub-hologram in a composite hologram to be loaded and transmit a deflecting instruction to the driver according to the result of acquisition. The driver is connected to each of the M light source components, and configured to drive, according to the deflecting instruction, the M light source components to deflect so that the direction of propagation of emergent light of each of the at least two light source components is identical to the direction of propagation of a reference wave corresponding to one of the M sub-holograms.

Optionally, the M light source components are arranged on the light incoming side of the spatial light modulator, the direction of propagation of the emergent light of each of the M light source components is different, and each of the M light source components is used for reproducing a corresponding sub-hologram in the at least one composite hologram, respectively.

Optionally, the at least two light source components are arranged successively and densely, and an included angle between the directions of propagation of emergent light of any two adjacent light source components in the at least two light source components is an acute angle.

Optionally, the light source completely covers a light incoming surface of the spatial light modulator.

Optionally, in a situation that there are multiple included angles, the multiple included angles are equal.

Optionally, the holographic display device further includes a controller having the at least one composite hologram stored therein. The controller is connected to each of the M light source components, and configured to acquire, from the at least one composite hologram, the direction of propagation of a reference wave corresponding to each sub-hologram in a composite hologram to be loaded and activate, according to the result of acquisition, some of the M light source components. The direction of propagation of emergent light of each of the at least two activated light source components among the M light source components is identical to the direction of propagation of a reference wave corresponding to a sub-hologram in the composite hologram to be loaded.

Optionally, the holographic display device further includes a controller having the at least one composite hologram stored therein. The controller is configured to address each pixel unit of the spatial light modulator and write holographic data of the at least one composite hologram into the spatial light modulator.

Optionally, at least one of the M light source components includes a laser and a collimating beam expander arranged on a light outgoing side of the laser.

Optionally, at least one of the M light source components includes an LED light source.

In one aspect of the present disclosure, an embodiment of the present disclosure provides a display cabinet, including the holographic display device described above.

In one aspect of the present disclosure, an embodiment of the present disclosure provides a method for driving the holographic display device described above, including the steps of: loading at least one composite hologram by a spatial light modulator; and, providing, by a light source, readout light to the spatial light modulator, wherein the direction of propagation of emergent light of each of at least two light source components in the light source is identical to the direction of propagation of a reference wave corresponding to a sub-hologram in one of the at least one composite hologram.

Optionally, in a situation that the holographic display device includes a controller and a driver, the step of providing, by a light source, readout light to the spatial light modulator includes: storing at least one composite hologram by the controller; acquiring, by the controller and from the at least one composite hologram, the direction of propagation of a reference wave corresponding to each sub-hologram in a composite hologram to be loaded, and transmitting a deflecting instruction to the driver according to the result of acquisition; and, driving, by the driver and according to the deflecting instruction, the M light source components to deflect so that the direction of propagation of emergent light of each of at least two light source components among the M light source components is identical to the direction of propagation of a reference wave corresponding to a corresponding sub-hologram in the composite hologram to be loaded.

Optionally, in a situation that the holographic display device includes a controller, M light source components of the light source are arranged on a light incoming side of the spatial light modulator, the direction of propagation of emergent light of each of at least two light source components among the M light source components is different and each of at least two light source components among the M light source components is used for reproducing a corresponding sub-hologram in the at least one composite hologram, the step of providing, by a light source, readout light to the spatial light modulator includes: storing at least one composite hologram by the controller; acquiring, by the controller and from the at least one composite hologram, the direction of propagation of a reference wave corresponding to each sub-hologram in a composite hologram to be loaded; and, activating, by the controller and according to the result of acquisition, at least two of the M light source components, the direction of propagation of emergent light of each of the at least two activated light source components among the M light source components being identical to the direction of propagation of a reference wave corresponding to a sub-hologram in the composite hologram to be loaded. Optionally, the step of loading a composite hologram by a spatial light modulator includes: addressing, by the controller, each pixel unit of the spatial light modulator, and writing holographic data of at least one composite hologram into the spatial light modulator.

Optionally, the step of loading at least one composite hologram by a spatial light modulator includes: addressing, by the controller, each pixel unit of the spatial light modulator, and writing holographic data of the at least one composite hologram into the spatial light modulator.

In one aspect of the present disclosure, an embodiment of the present disclosure provides a controller for the holographic display device described above, including a processor and a memory. The memory is configured to store at least one composite hologram, one of the at least one composite hologram being formed by superposing N sub-holograms. The processor is configured to control the M light source components so that the direction of propagation of emergent light of each of at least two light source components among the M light source components is identical to the direction of propagation of a reference wave corresponding to one of the N different sub-holograms.

In another aspect of the present disclosure, an embodiment of the present disclosure provides a non-transient computer-readable storage medium having stored thereon computer programs which, after loaded to a processor and when executed by the processor, implement the control method described above.

In another aspect of the present disclosure, an embodiment of the present disclosure provides a computer program product that, when executed by a processor, implements the control method described above.

BRIEF DESCRIPTION OF THE DRAWINGS

To describe the technical solutions in the embodiments of the present disclosure or in the prior art more clearly, the accompanying drawings to be used in the descriptions of the embodiments or the prior art will be briefly described below. Apparently, the accompanying drawings described hereinafter are some of embodiments of the present disclosure, and a person of ordinary skill in the art can obtain other accompanying drawings according to these drawings without paying any creative effort.

DETAILED DESCRIPTION

The technical solutions in the embodiments of the present disclosure will be clearly and completely described below with reference to the accompanying drawings in the embodiments of the present disclosure. Apparently, the embodiments described herein are merely a part but not all of the embodiments of the present disclosure. All other embodiments obtained by a person of ordinary skill in the art without paying any creative effort on the basis of the embodiments in the present disclosure shall fall into the protection scope of the present disclosure.

Figure 1A:
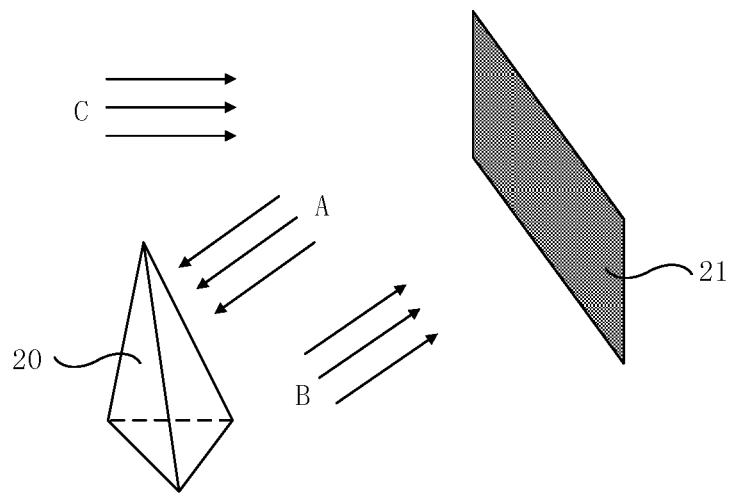
FIG. 1a is a schematic diagram of a holographic recording method.
Figure 1B:
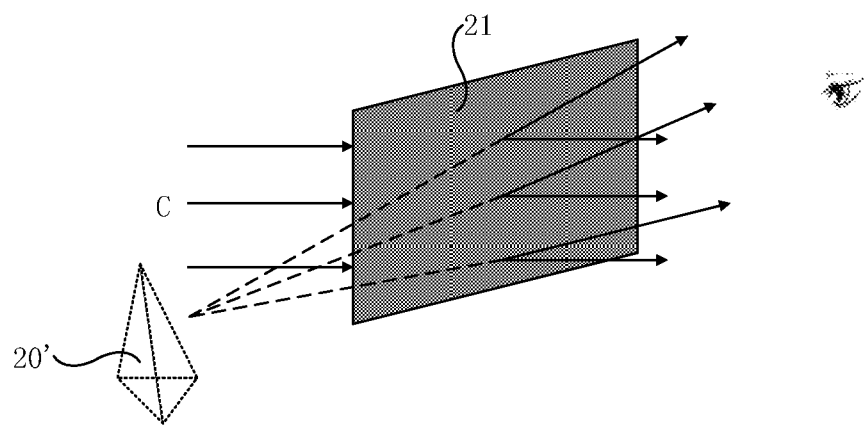
FIG. 1b is a schematic diagram of a holographic reproduction method.

There is a holographic display technology in which optical holography is realized by light interference and diffraction principles. Specifically, as shown in FIG. 1a, a light beam A is irradiated onto an object 20, reflected light and scattered light from the surface of this object 20 form an object wave B, and the object wave B is irradiated onto a holographic plate 21. Another light beam coherent to the object wave B is used as a reference wave C and irradiated onto the holographic plate 21 to expose the holographic plate 21, so that phase and amplitude information in the object wave B is recoded on the holographic plate 21 in form of interference fringes. Subsequently, as shown in FIG. 1b, by the optical wave diffraction theory, a same beam of coherent light is irradiated, at the same angle as the reference wave C during shooting, onto the holographic plate 21 with interference fringes, and the object wave can be thus reproduced to form a virtual image 20' of the object 20, thereby realizing holographic display.

However, since photosensitive material is provided on the holographic plate 21, the interference fringes recorded on the exposed holographic plate 21 will not be changed. When other images need to be displayed, the holographic plate 21 needs to be replaced so that the contents to be holographically displayed are limited.

Figure 2:
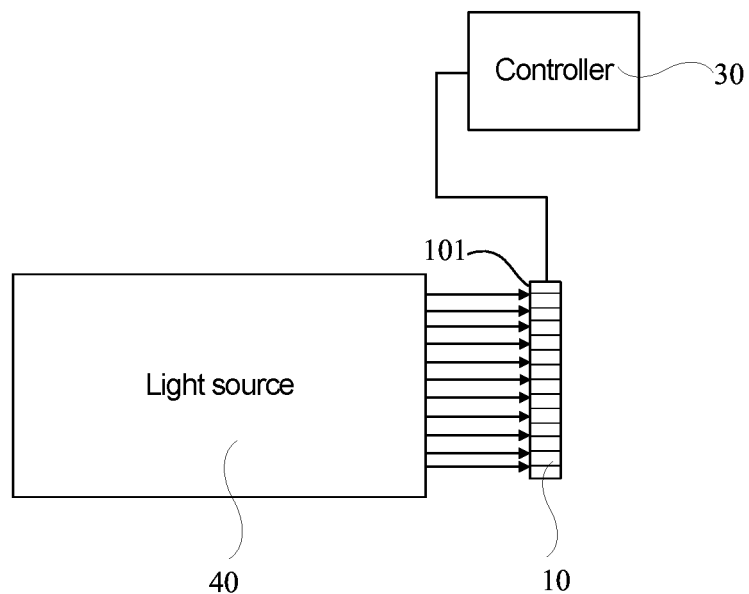
FIG. 2 is a structure diagram of a holographic display device according to an embodiment of the present disclosure.

To solve the problem, i.e., to be free of replacing a holographic plate during the holographic display of multiple images, an embodiment of the present disclosure provides a holographic display device, as shown in FIG. 2, including a spatial light modulator (SLM) 10. The spatial light modulator 10 is configured to load at least one composite hologram.

It is to be noted that one of the at least one composite hologram is formed by superposing N sub-holograms. The N sub-holograms are sub-holograms formed by interfering respective object waves B with respective reference waves C of multiple different objects through the interference principle shown in FIG. 1a. The optical essence of the composite hologram means that a holographic plate is exposed multiple times and images of different objects are overlapped on the holographic plate. Since the directions of propagation of respective reference waves C corresponding to different objects are different, virtual images of different objects can be displayed separately without mutual interference when sub-holograms are reproduced by using the reference waves C corresponding to the multiple objects.

On this basis, at least one composite hologram can be acquired by a computer generated hologram (CGH) technology. In a situation that the at least one composite hologram includes multiple holograms, the multiple holograms can be multiple successive images in a certain display order, or multiple non-successive and irrelevant images. This will not be limited in the present disclosure.

In the CGH technology, a mathematical description function of an object wave B can be directly input into a computer to simulate an actual interference process, so that interference fringes can be calculated and a computer generated hologram can be drawn.

Specifically, the process of drawing a composite hologram by computer-generated holography can include the following steps.

Firstly, sampling is made to obtain the values of multiple objects 20 or wave surfaces at discrete sampling points.

Then, an optical field distribution of the object wave B of each of the multiple objects 20 on a holographic plane is calculated.

Subsequently, encoding is performed, that is, a complex amplitude distribution of light waves on the holographic plane is encoded into a change in transmittance of each sub-hologram.

Finally, the hologram is plotted. Specifically, under the control of the computer, the change in transmittance of each sub-hologram is plotted to form a composite hologram. If the resolution of the device for plotting is not big enough, a large hologram is plotted and then zoomed out to obtain a composite hologram.

In this case, multiple composite holograms can be obtained by repeating the steps for multiple times.

Figure 3:
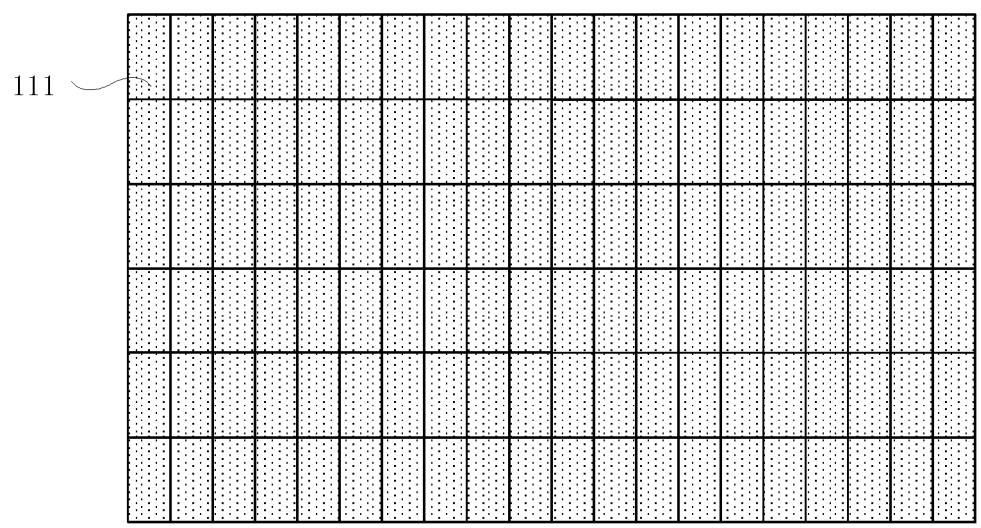
FIG. 3 is a structure diagram of the spatial light modulator in FIG. 2.

On this basis, the computer loads the computer generated hologram to pixel units 11 of the spatial light modulator 10 shown in FIG. 3 by optical addressing or electrical addressing, so that the computer generated hologram can be reproduced in an actual light path. Although the computer generated hologram is plotted by the computer, in terms of the optical essence, it is equivalent to a holographic interference pattern shot on the holographic plate by using the object wave and the reference wave. Since the direction of the reference wave corresponding to the computer generated hologram can be obtained by corresponding calculation, the principle of the reproduction process is the same as the principle shown in FIG. 1b. In other words, a coherent light can be irradiated onto the spatial light modulator 10 in the same direction as the reference wave corresponding to the hologram to reproduce the composite hologram loaded to the spatial light modulator 10.

The spatial light modulator 10 may include a liquid crystal spatial light modulator. Moreover, the spatial light modulator 10 may be of a reflection type or a transmission type. This will not be limited in the present disclosure.

To write holographic data of at least one composite hologram into the spatial light modulator by optical addressing or electrical addressing, as shown in FIG. 2, the holographic display device in this embodiment of the present disclosure further includes a controller 30 having at least one composite hologram stored therein. The controller 30 is connected to the spatial light modulator 10. The controller 30 is configured to address each pixel unit 111 of the spatial light modulator 10 and write holographic data of the at least one composite hologram into the spatial light modulator 111 so that the spatial light modulator 10 can load the at least one composite hologram.

In some embodiments of the present disclosure, in order to reproduce the composite hologram, the holographic display device, as shown in FIG. 2, further includes a light source 40 arranged on a light incoming side of the spatial light modulator 10. The light source 40 is configured to provide readout light to the spatial light modulator 10.

Figure 4:
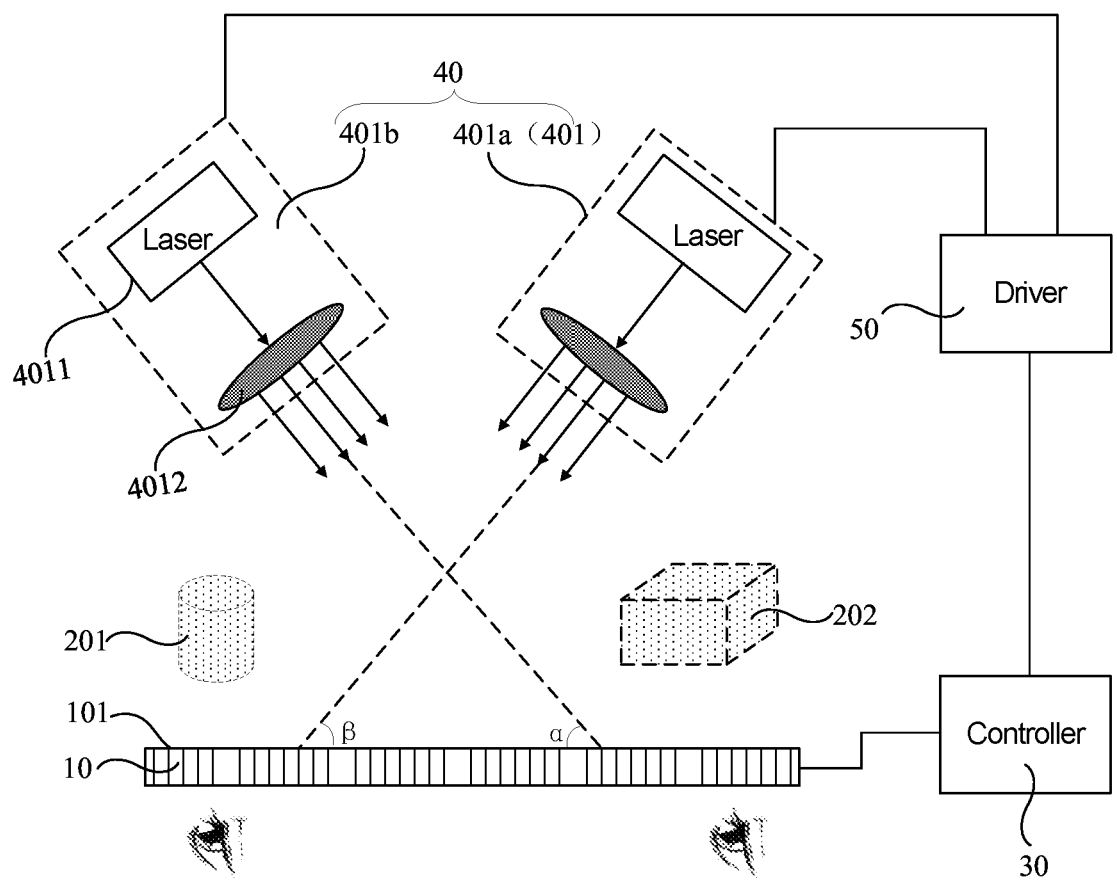
FIG. 4 is a schematic diagram of displaying a composite hologram by a holographic display device according to an embodiment of the present disclosure.

As shown in FIG. 4, the light source 40 includes M light source components 401. The direction of propagation of emergent light of each of at least two light source components 401 among the M light source components is identical to the direction of propagation of a reference wave C corresponding to a sub-hologram in one composite hologram. The number M of the light source components 401 included in the light source 40 is greater than or equal to the number N of sub-holograms superposed in this composite hologram, that is, M≥N≥2, wherein M and N are positive integers. In this way, each sub-hologram in this composite hologram can be reproduced by the readout light emitted from the corresponding light source component 401 in the light source 40. When the holographic display device provided in an embodiment of the present disclosure holographically displays multiple images, it is unnecessary to replace the holographic plate.

In a situation that the number M of the light source components 401 is equal to the number N of sub-holograms in a composite hologram, the directions of propagation of emergent light of the M light source components 401 are in one-to-one correspondence to the directions of propagation of the respective reference waves C of the N sub-holograms.

In a situation that the number M of the light source components 401 is unequal to the number N of sub-holograms in a composite hologram, since M>N, the directions of propagation of emergent light of N light source components 401 among the M light source components 401 are in one-to-one correspondence to the directions of propagation of the respective reference waves C of the N sub-holograms in the composite hologram.

In a situation that the number M of the light source components 401 is unequal to the number N of sub-holograms in a composite hologram, the directions of propagation of emergent light of S light source components 401 among the M light source components 401 are in one-to-one correspondence to the directions of propagation of respective reference waves C of S sub-holograms among the N sub-holograms. N>S>2, wherein S is a positive integer.

In some embodiments of the present disclosure, multiple composite holograms are stored in the controller 30. For example, in FIG. 4, the first composite hologram is formed by superposing two sub-holograms (including a first sub-hologram 201 and a second sub-hologram 202), and the light source 40 includes two light source components 401a and 401b. In this case, the direction of propagation of emergent light of one light source component 401a is identical to the direction of propagation of a reference wave corresponding to the first sub-hologram 201, and an included angle between the direction of propagation of the emergent light and a light incoming surface of the spatial light modulator 10 is $\beta$. The direction of propagation of emergent light of the other light source component 401b is identical to the direction of propagation of a reference wave corresponding to the second sub-hologram 202, and an included angle between the direction of propagation of the emergent light and the light incoming surface 101 of the spatial light modulator 10 is $\alpha$. By using the light source components 401 having different directions of propagation of the emergent light, the sub-holograms superposed in a composite hologram can be reproduced separately, so that the different sub-holograms can be displayed simultaneously and independently without mutual interference. In this way, observers at different positions can view different display contents. For example, in FIG. 4, an observer on the left can view the reproduced first sub-hologram 201, while an observer on the right can view the reproduced second sub-hologram 202.

In some embodiments of the present disclosure, as shown in FIG. 4, the light source component 401 may include a laser 4011 and a collimating beam expander 4012 arranged on a light outgoing side of the laser 4011. The collimating beam expander 4012 may convert a line light source emitted from the laser 4011 into a collimated area light source.

Figure 5:
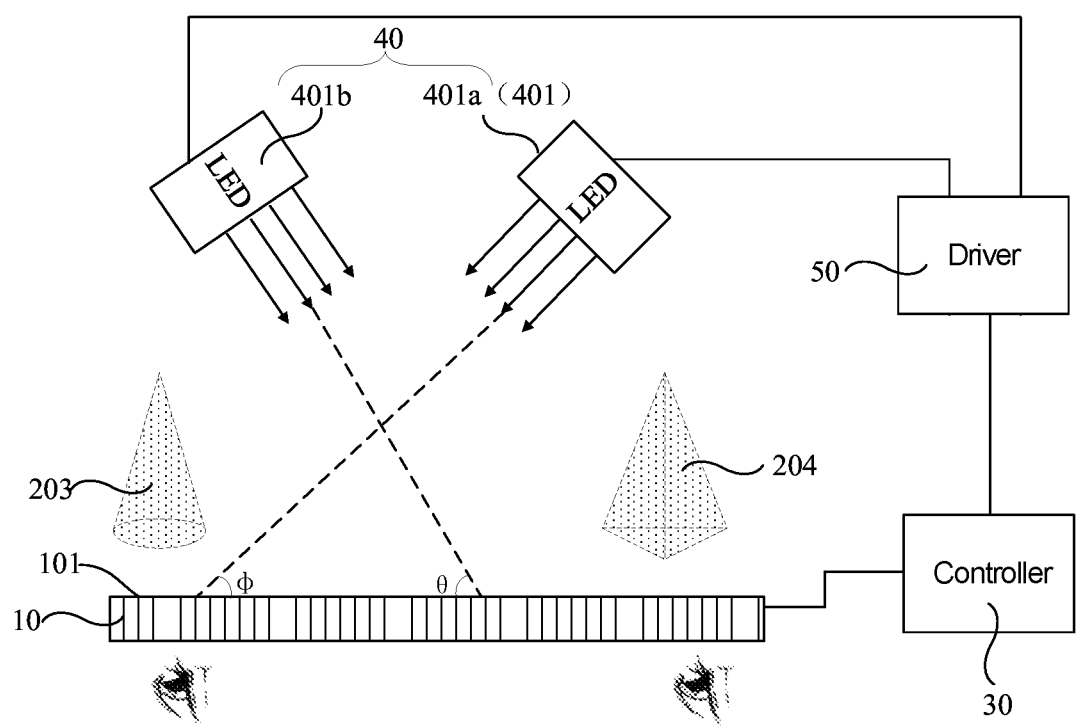
FIG. 5 is a structure diagram of a holographic display device for displaying a composite hologram according to an embodiment of the present disclosure.

In other embodiments of the present disclosure, as shown in FIG. 5, the light source component 401 may further include an LED light source. The LED light source may be a monochromatic light source, for example, a white light source.

In some embodiments of the present disclosure, the direction of propagation of initial emergent light of each light source component 401 may not exactly meet the requirement of reading the sub-holograms. In this case, the direction of propagation of the emergent light of each light source component 401 can be adjusted manually to be identical to the direction of propagation of a reference wave corresponding to each sub-hologram.

However, on one hand, the manual adjustment is not precise enough, so that the result of the holographic reproduction will be influenced; on the other hand, the manual adjustment is low in automation, time-consuming and labor-consuming. Therefore, in order to improve the display efficiency and the adjustment precision of the direction of propagation of the emergent light of each light source component 401 so as to realize better holographic reproduction and display effects, in some embodiments of the present disclosure, the following approaches are employed.

As shown in FIG. 4, the holographic display device provided in an embodiment of the present disclosure further includes a driver 50 and a controller 30 having multiple composite holograms stored therein.

The controller 30 is connected to the spatial light modulator 10. The controller 30 can address each pixel unit 111 of the spatial light modulator 10 and write holographic data of the first composite hologram into the spatial light modulator 10, so that the spatial light modulator 10 is allowed to load the first composite hologram.

In addition, the controller 30 is connected to the driver 50, and the controller 30 is configured to acquire, from the stored multiple composite holograms, the direction of propagation of a reference wave corresponding to each sub-hologram in the first composite hologram, for example, angles $\beta$ and $\alpha$, and then transmit a deflecting instruction to the driver 50 according to the result of acquisition.

The driver 50 is connected to each of the light source components 401a and 401b. The driver 50 is configured to drive, according to the deflecting instructions, the light source components 401a and 401b to deflect.

When the spatial light modulator 10 loads the first composite hologram, the controller 30 acquires included angles $\beta$ and $\alpha$ between the directions of propagation of reference waves corresponding to the first and second sub-holograms and the light incoming surface 101 of the spatial light modulator 10. Subsequently, the controller 30 transmits deflecting instructions to the driver according to the result of acquisition. Specifically, the controller 30 can transmit, according to the acquired angles $\beta$ and $\alpha$, a first deflecting instruction matched with the angle $\beta$ and a second deflecting instruction matched with the angle $\alpha$ to the driver 50. In this way, the direction of propagation of emergent light of each of the two light source components 401a and 401b is identical to the direction of propagation of a reference wave corresponding to a sub-hologram in the first composite hologram, so that the reproduction of each sub-hologram in the first composite hologram is realized.

Subsequently, the controller 30 can write holographic data of the second composite hologram into the spatial light modulator 10 by addressing, so that the content displayed by the holographic display device is switched to the second composite hologram. In a situation that the sub-holograms superposed in the second composite hologram are different from the sub-holograms superposed in the first composite hologram, if the direction of propagation of a reference wave C corresponding to each sub-hologram in the second composite hologram is identical to the direction of propagation of a reference wave C corresponding to each sub-hologram in the first composite hologram, it is unnecessary to change the direction of propagation of each light source component 401.

However, in a situation that the sub-holograms superposed in the second composite hologram are different from the sub-holograms superposed in the first composite hologram, generally, the direction of propagation of a reference wave C corresponding to each sub-hologram in the second composite hologram is different from the direction of propagation of a reference wave C corresponding to each sub-hologram in the first composite hologram, it is necessary to change the angle of the required readout light. For example, in a situation that the first composite hologram shown in FIG. 4 includes superposed the first sub-hologram 201 and the second sub-hologram 201, and the second composite hologram shown in FIG. 5 includes superposed a third sub-hologram 203 and a fourth sub-hologram 204, the direction of propagation of emergent light of the light source component 401a in the light source 40 needs to be identical to the direction of propagation of the reference wave corresponding to the third sub-hologram 203, that is, the included angle between the direction of propagation of the emergent light of the light source component 401a and the light incoming surface 101 of the spatial light modulator 10 needs to be changed from $\beta$ to $\phi$. In addition, the direction of propagation of the emergent light of the other light source component 401b needs to be identical to the direction of propagation of the reference wave corresponding to the fourth sub-hologram 204, that is, the included angle between the direction of propagation of the emergent light of the light source component 401b and the light incoming surface 101 of the spatial light modulator 10 needs to be changed from α to θ.

In a situation that the sub-holograms superposed in the second composite hologram are partially different from the sub-holograms superposed in the first composite hologram, similarly, the sum-holograms in the second composite hologram may be reproduced by changing the directions of propagation of emergent light of at least one part of the light source components 401 in the light source 40.

When the spatial light modulator 10 loads the first hologram, the controller 30 is configured to acquire, from the stored multiple composite holograms, the direction of propagation of a reference wave corresponding to each sub-hologram in the second composite hologram, that is, the angles φ and θ. Subsequently, the controller 30 transmits deflecting instructions to the driver 50 according to the result of acquisition. Specifically, the controller 30 transmits, according to the acquired angles φ and θ, a third deflecting instruction matched with the angle φ and a fourth deflecting instruction matched with the angle θ to the driver 50.

The driver 50 is connected to each of the light source components 401a and 401b. The driver 50 is configured to drive, according to the deflecting instructions, the light source components 401a and 401b to deflect so that the direction of propagation of emergent light of each of at least two light source components is identical to the direction of propagation of a reference wave corresponding to a sub-hologram in the second composite hologram. Specifically, the driver 50 controls, according to the third deflecting instruction, one light source component 401a to deflect so that the included angle between the direction of propagation of the emergent light of the light source component 401a and the light incoming surface 101 of the spatial light modulator 10 is the angle φ. In this way, the direction of propagation of the emergent light of the light source component 401a is identical to the direction of propagation of the reference wave of the third sub-hologram 203, and the third sub-hologram 203 can thus be reproduced. In addition, the driver 50 further controls, according to the fourth deflecting instruction, the other light source component 401b to deflect so that the included angle between the direction of propagation of the emergent light of the light source component 401b and the light incoming surface 101 of the spatial light modulator 10 is the angle θ. In this way, the direction of propagation of the emergent light of the light source component 401b is identical to the direction of propagation of the reference wave of the fourth sub-hologram 204, and the fourth sub-hologram 204 can thus be reproduced.

In a situation that the sub-holograms superposed in the second composite hologram are different from the sub-holograms superposed in the first composite hologram, by changing the directions of propagation of emergent light of at least one part of the light source components 401 in the light source 40, the sum-holograms in the second composite hologram can be reproduced, so that observers at different positions can view different display contents. For example, in FIG. 5, an observer on the left can view the reproduced third sub-hologram 203, while an observer on the right can view the reproduced fourth sub-hologram 204.

In some embodiments of the present disclosure, by a method similar to the above method, multiple composite holograms can be displayed. The specific process is similar to the above process and will not be repeated here.

In the display process of the holographic display device, at least one composite hologram can be drawn by the computer generated holography, and the at least one composite hologram can be written into the spatial light modulator 10 by optical addressing or electrical addressing, so that the at least one composite hologram is loaded. Subsequently, read light is provided to the spatial light modulator 10 by the light source 40, and the at least one composite hologram can be reproduced. As described above, by adjusting the direction of propagation of the emergent light of each light source component 401, it is unnecessary to replace the holographic plate 21 when the holographic display device displays different composite holograms, so that the holographic display process is more convenient.

On the other hand, since the composite hologram includes multiple superposed sub-holograms, the direction of propagation of emergent light of each of at least two light source components 401 in the light source is identical to the direction of propagation of a reference wave corresponding to a sub-hologram in one composite hologram, the light source 40 can reproduce multiple sub-holograms of one composite hologram respectively in one frame, so that multiple users at different positions are allowed to simultaneously view different holographic images and the display content is richer.

In another aspect of the embodiments of the present disclosure, through the cooperation between the controller 30 and the driver 50, the angle of irradiation of multiple light source components 401 for providing readout light can be regulated flexibly, so that the requirement of producing different sub-holograms in different composite holograms is satisfied better.

In some embodiments of the present disclosure, in a situation that there are sufficient light source components 401 included in the light source 40, without changing the direction of propagation of emergent light of the light source component 401 in the light source 40, the purpose of reproducing sub-holograms in different composite holograms can also be achieved.

In an embodiment of the present disclosure, sufficient light source components 401 can be arranged on the light incoming side of the spatial light modulator 10. The direction of propagation of emergent light of each of at least two light source components among the light source components 401 is different. Each of at least two light source components among the light source components 401 is used for reproducing one sub-hologram in at least one composite hologram.

In another embodiment of the present disclosure, multiple light source components 401 are arranged around a central position of the spatial light modulator 10 in form of a circular arc, and the emergent direction of each light source component 401 is located above the radial direction of the circular arc. Of course, the arrangement mode of the light source components 401 is limited thereto as long as the light outgoing direction of the multiple light source components 401 can satisfy the requirement for reproducing each sub-hologram in at least one composite hologram.

In an embodiment of the present disclosure, it is possible that the controller 30 is directly connected to each light source component 401, without any driver 50.

Figure 6A:
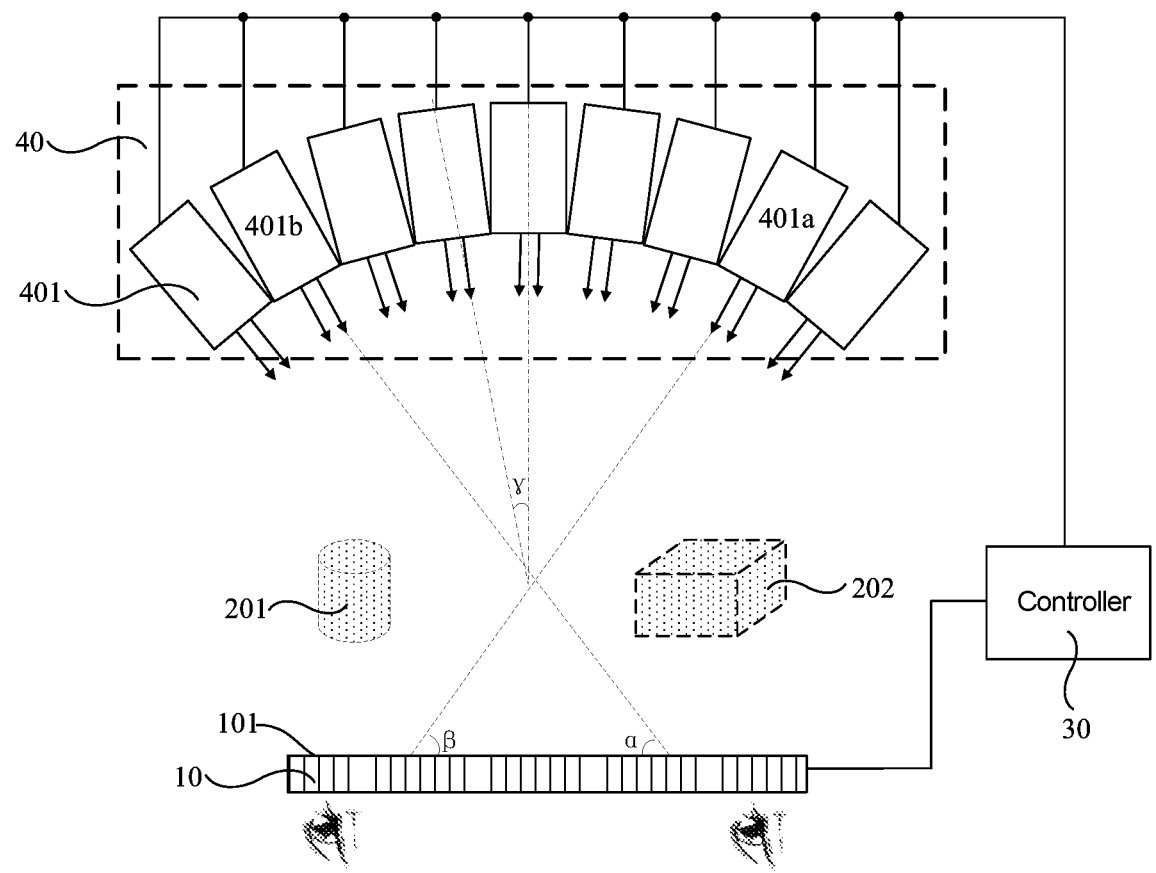
FIG. 6a is a structure diagram of another holographic display device for displaying a composite hologram according to an embodiment of the present disclosure.
Figure 6B:
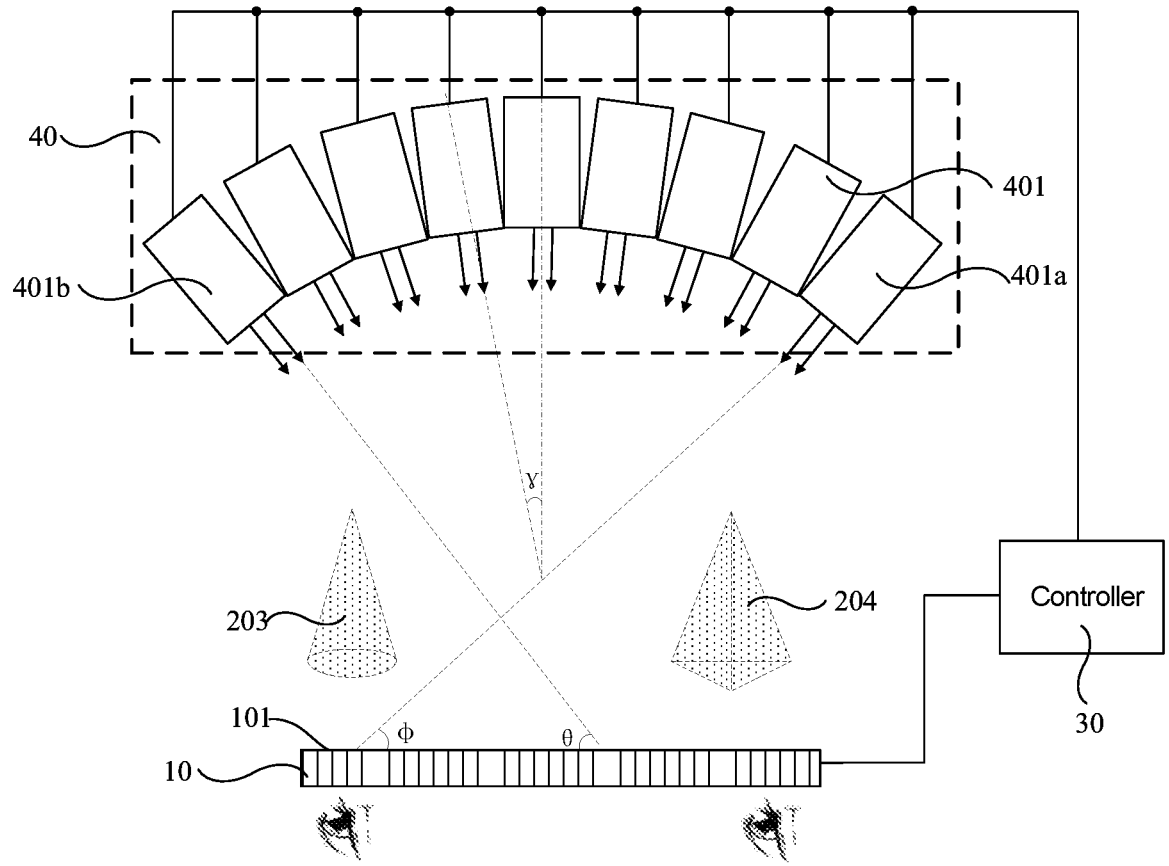
FIG. 6b is a structure diagram of still another holographic display device for displaying a composite hologram according to an embodiment of the present disclosure.

In an embodiment of the present disclosure, as shown in FIG. 6a or FIG. 6b, at least two light source components among the M light source components 401 in the light source 40 are arranged successively and densely, and an included angle between the directions of propagation of emergent light of any two adjacent light source components in the at least two light source components is an acute angle. Optionally, in a situation that there are multiple included angles between the directions of propagation of emergent light of any two adjacent light components in the at least two light source components, the multiple included angles are equal.

Arranging the at least two light source components successively and densely means that, within an allowable mounting tolerance and under the premise of ensuring an included angle between the directions of propagation of emergent light of at least two adjacent light source components among at least two light source components 401, the distance between two adjacent light source components can be decreased as far as possible. In some embodiments of the present disclosure, two adjacent light source components among at least two light source components 401 can partially come into contact with each other.

In some embodiments of the present disclosure, the holographic display device includes the controller 30 having multiple composite holograms stored therein. The controller 30 is connected to each light source component 401. The controller is configured to acquire, from the stored multiple composite holograms, the direction of propagation of a reference wave corresponding to each sub-hologram in a composite hologram to be loaded. Subsequently, the controller 30 activates, according to the result of acquisition, at least two light source components 401 among the M light source components so that the direction of propagation of emergent light of each of the at least two activated light source components 401 is identical to the direction of propagation of a reference wave corresponding to a corresponding sub-hologram in the composite hologram to be loaded.

In some embodiments of the present disclosure, as shown in FIG. 6a or FIG. 6b, the light source 40 completely covers the light incoming surface 101 of the spatial light modulator 10; and, in a situation that there are multiple included angles between the directions of propagation of emergent light of any two adjacent light components among the at least two light source components, the multiple included angles are equal. In this way, the light outgoing surface of the light source 40 consisting of multiple light source components 401 is arc-shaped. In a situation that all light source components 401 in the light source 40 emit light, light emitted from the light source 40 can completely cover the light incoming surface 101 of the spatial light modulator 10.

As shown in FIG. 6a, when the spatial light modulator 10 loads the first composite hologram, the controller 30 activates, according to the acquired angle β, one light source component 401a so that an included angle between the direction of propagation of the emergent light of the light source component 401a and the light incoming surface 101 of the spatial light modulator 10 is the angle β. In this way, the direction of propagation of the emergent light of the light source component 401a is identical to the direction of propagation of a reference wave of the first sub-hologram 201, and the first sub-hologram 201 can thus be reproduced. In addition, the controller 30 activates, according to the acquired angle α, the other light source component 401b so that an included angle between the direction of propagation of the emergent light of the light source component 401b and the light incoming surface 101 of the spatial light modulator 10 is the angle α. In this way, the direction of propagation of the emergent light of the light source component 401b is identical to the direction of propagation of a reference wave of the second sub-hologram 202, and the second sub-hologram 202 can thus be reproduced.

When the spatial light modulator 10 loads the second composite hologram, as shown in FIG. 6b, the controller 30 activates, according to the acquired angle ϕ, one light source component 401a so that an included angle between the direction of propagation of the emergent light of the light source component 401a and the light incoming surface 101 of the spatial light modulator 10 is the angle ϕ. In this way, the direction of propagation of the emergent light of the light source component 401a is identical to the direction of propagation of a reference wave of the third sub-hologram 203, and the third sub-hologram 203 can thus be reproduced. In addition, the controller 30 further activates, according to the acquired angle θ, the other light source component 401b so that an included angle between the direction of propagation of the emergent light of the light source component 401b and the light incoming surface 101 of the spatial light modulator 10 is the angle θ. In this way, the direction of propagation of the emergent light of the light source component 401b is identical to the direction of propagation of a reference wave of the fourth sub-hologram 204, and the fourth sub-hologram 204 can thus be reproduced.

In a situation that the sub-holograms superposed in the second composite hologram are different from the sub-holograms superposed in the first composite hologram, only some of light source components 401 in the light source 40 can be activated by the controller 30 to reproduce the sub-holograms in the second composite hologram.

In the holographic display device provided in this embodiment, the way of lightening multiple light source components 401 for providing readout light by the controller 30 can be regulated flexibility, and the requirement of reproducing different sub-holograms in different composite holograms is thus satisfied better.

Multiple composite holograms can be displayed by a method similar to the above control method. The specific process is roughly similar to the above process and will not be repeated here.

It is to be noted that, the solutions shown in FIG. 5 (or FIG. 4) and FIG. 6a (or FIG. 6b) are described by taking one composite hologram being formed by superposing two sub-holograms (including a first sub-hologram 201 and a second sub-hologram 202) as example. The solutions in a situation where one composite hologram is formed by superposing more than two sub-holograms are as described above and will not be repeated here.

In the solution shown in FIG. 5 (or FIG. 4), by changing the angle of propagation of emergent light of the light source components 401, at least two deflected light source components 401 can be used to reproduce at least two sub-holograms in a composite hologram to be loaded, respectively. However, in the solution shown in FIG. 6a (or FIG. 6b), the controller 30 only needs to activate some of the light source components 401 so that at least two activated light source components 401 are used to reproduce at least two sub-holograms in the composite hologram to be loaded, respectively. In this case, in a situation that the number of sub-holograms included in different composite holograms to be loaded is consistent, in the solution shown in FIG. 5 (or FIG. 4), the number of the light source components 401 can be decreased and excessive light source components 401 are not required. In addition, in a situation that the number of sub-holograms included in different composite holograms is different, for example, that a first composite hologram includes two sub-holograms while a second composite hologram includes three sub-holograms, in the solution shown in FIG. 6a (or FIG. 6b), it is only required to selectively activate one more light source components 401 with a corresponding direction. Therefore, the adjustment process is more flexible and simpler, and the light source components 401 do not need to be driven to deflect as long as they are lightened.

In addition, the two technical solutions can also be combined. For example, in a situation that the solution shown in FIG. 6a (or FIG. 6b) of arranging multiple light source components 401 on one side of the light incoming surface 101 of the spatial light modulator 10 is employed, the holographic display device can be further provided with a driver 50 shown in FIG. 5 (or FIG. 4). The connection mode and function of the driver 50 are as described above. In this case, it is possible to activate some of the light source components 401 by the controller 30 as required; or, it is also possible to deflect some of the light source components 401 by the driver 50 as required under the control of the controller 30, so as to achieve the purpose of adjusting the direction of propagation of emergent light of the light source components 401. The specific adjustment process is as described above and will not be repeated here.

An embodiment of the present disclosure further provides a display cabinet, including the holographic display device described above. The display cabinet has the same structure and beneficial effects as the holographic display device provided in the foregoing embodiments. The structure and beneficial effects of the holographic display device have been described in detail in the foregoing embodiments and will not be repeated here. The display cabinet is applicable to museum, aquarium, science and technology museum and other public places. In addition, the display cabinet can be cubic, cylindrical or the like, and this will not be limited in the present disclosure.

Figure 7:
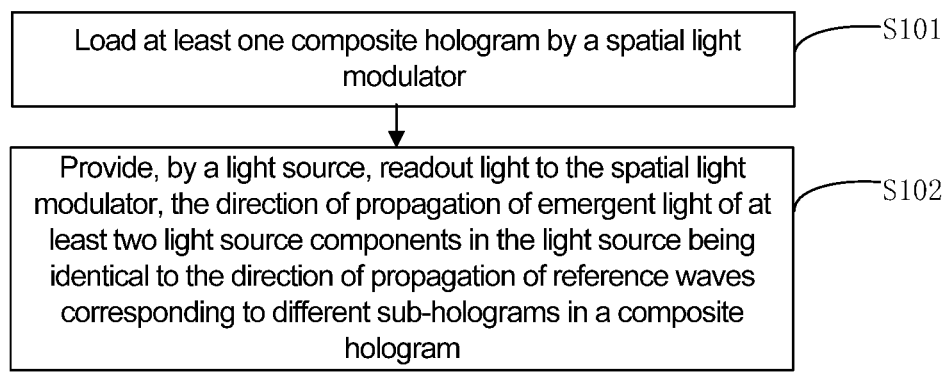
FIG. 7 is a flowchart of a method for driving a holographic display device according to an embodiment of the present disclosure.

An embodiment of the present disclosure provides a method for driving the holographic display device described above, as shown in FIG. 7, including the following steps.

S101: The spatial light modulator 10 shown in FIG. 2 loads at least one composite hologram.

In the step S101, the driving method is as follows:

The controller 30 addresses each pixel unit 111 of the spatial light modulator 10, and writes holographic data of the at least one composite hologram into the spatial light modulator 10. In a situation that the at least one composite hologram includes multiple composite holograms, the multiple composite holograms can be multiple successive images in a certain display order, or multiple non-successive and irrelevant images. In a situation that the multiple composite holograms are in a certain display order, dynamically holographic display can be realized.

S102: The light source 40 provides readout light to the spatial light modulator 10. This step may include: making the direction of propagation of emergent light of each of at least two light source components 401 in the light source 40 identical to the direction of propagation of a reference wave corresponding to a sub-hologram in one composite hologram.

On one hand, during the display process of the holographic display device, at least one composite hologram can be drawn by the computer generated holography, and the at least one composite hologram is written into the spatial light modulator 10 by optical addressing or electrical addressing, thereby realizing the loading of the at least one composite hologram. Subsequently, readout light is provided to the spatial light modulator 10 by the light source 40 so as to reproduce the at least one composite hologram. As described above, it is unnecessary to replace the holographic plate 21 during the process of displaying multiple images by the holographic display device, so that the holographic display process is faster and more convenient.

On the other hand, since one composite hologram includes multiple superposed sub-holograms, and the direction of propagation of emergent light of each of at least two light source components 401 is identical to the direction of propagation of a reference wave corresponding to a sub-hologram in one composite hologram, the light source 40 can reproduce multiple sub-holograms in one composite hologram in one frame, so that multiple users at different positions are allowed to simultaneously view different holographic images and the display content is richer.

When the spatial light modulator loads a composite hologram or when the loaded composite hologram is switched from one image to another new image, the purpose of reproducing sub-holograms in different composite holograms can be achieved by changing the direction of propagation of emergent light of at least one part of light source components 401 in the light source 40.

Figure 8:
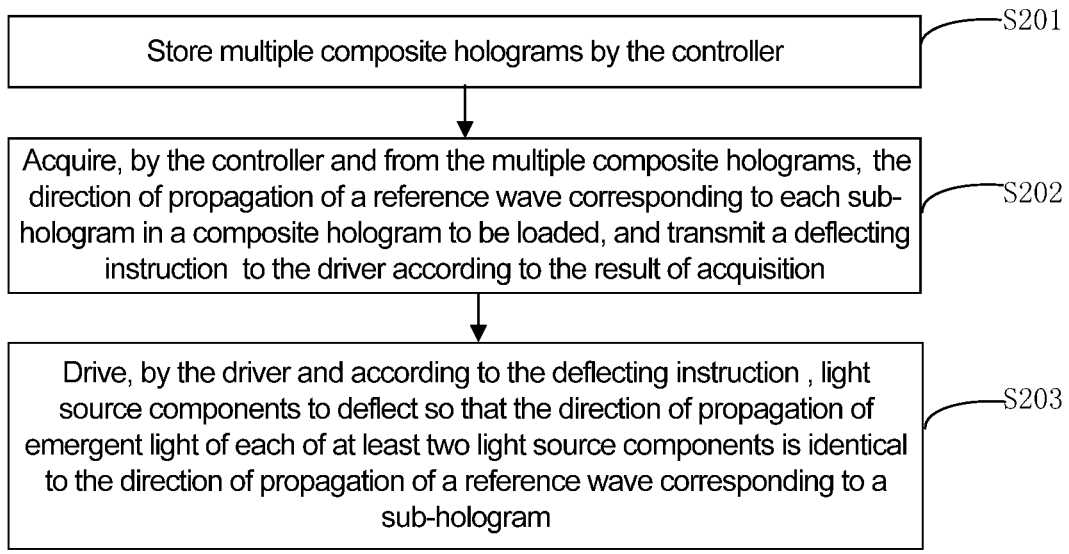
FIG. 8 is a flowchart of a sub-step included in step S102 of FIG. 7 when multiple composite holograms are displayed.

By taking the controller 30 storing multiple composite holograms as example, in a situation that the holographic display device (as shown in FIG. 5) includes a controller 30 and a driver, as shown in FIG. 8, the method for providing, by the light source 401, readout light to the spatial light modulator 10 includes the following steps.

S201: The controller 30 acquires and stores multiple composite holograms.

S202: The controller 30 acquires, from the multiple composite holograms, the direction of propagation of a reference wave corresponding to each sub-hologram in a composite hologram to be loaded, that is, the angles $\beta$ (or $\phi$) and $\alpha$ (or $\theta$). Then, the controller transmits, according to the result of acquisition, deflecting instructions to the driver 50.

Optionally, the controller 30 transmits, according to the acquired angles $\beta$ (or $\phi$) and $\alpha$ (or $\theta$), one deflecting instruction matched with the angle $\beta$ (or $\phi$) and another deflecting instruction matched with the angle $\alpha$ (or $\theta$) to the driver 50.

S203: The driver 50 drives, according to the deflecting instructions, the light source components 401 to deflect so that the direction of propagation of emergent light of each of at least two light source components 401 is identical to the direction of propagation of a reference wave corresponding to a sub-hologram in a composite hologram to be loaded.

By taking the holographic display device reproducing sub-holograms in the second composite hologram as example, as shown in FIG. 5, the driver 50 controls, according to the one deflecting instruction, one light source component 401a to deflect so that the included angle between the direction of propagation of the emergent light of the light source component 401a and the light incoming surface 101 of the spatial light modulator 10 is the angle $\phi$. In this way, the direction of propagation of the emergent light of the light source component 401a is identical to the direction of propagation of the reference wave of the third sub-hologram 203, and the third sub-hologram 203 can thus be reproduced. In addition, the driver 50 controls, according to the another deflecting instruction, the other light source component 401b to deflect so that the included angle between the direction of propagation of the emergent light of the light source component 401b and the light incoming surface 101 of the spatial light modulator 10 is the angle $\theta$. In this way, the direction of propagation of the emergent light of the light source component 401b is identical to the direction of propagation of the reference wave of the fourth sub-hologram 204, and the fourth sub-hologram 204 can thus be reproduced.

In a situation that the sub-holograms superposed in the second composite hologram are different from the sub-holograms superposed in the first composite hologram, by changing the direction of propagation of emergent light of at least one part of light source components in the light source 40, the sum-holograms in the second composite hologram can be reproduced so that observers at different positions can view different display contents. For example, in FIG. 5, an observer on the left can view the reproduced third sub-hologram 203, while an observer on the right can view the reproduced fourth sub-hologram 204. Similarly, multiple composite holograms can be displayed by the above method. The specific process is as described above and will not be repeated here.

For another example, in a situation that there are sufficient light source components 401 included in the light source 40, without changing the direction of propagation of emergent light of light source component 401 in the light source 40, the purpose of reproducing sub-holograms in different composite holograms can also be achieved.

Figure 9:
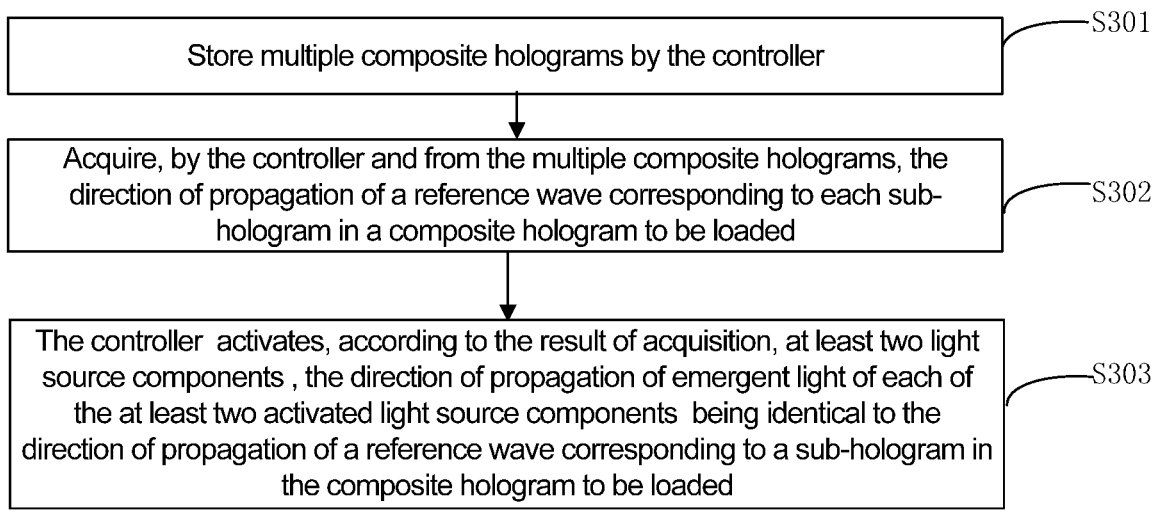
FIG. 9 is a flowchart of another sub-step included in step S102 of FIG. 7 when multiple composite holograms are displayed.

The holographic display device includes a controller 30, and M light source components 401 in the light source 40 are arranged on the light incoming side of the spatial light modulator 10. The direction of propagation of emergent light of each of at least two light source components among the M light source components 401 is different, and each of at least two light source components among the M light source components 401 is used for reproducing a corresponding sub-hologram in a composite hologram. In this situation, as shown in FIG. 9, the method for providing, by the light source 401, readout light to the spatial light modulator 10 includes the following steps.

S301: The controller 30 stores multiple composite holograms.

S302: The controller 30 acquires, from the multiple composite holograms, the direction of propagation of a reference wave corresponding to each sub-hologram in a composite hologram to be loaded, that is, the angles β (or φ) and α (or θ).

S303: The controller 30 activates, according to the result of acquisition, at least two light source components 401, the direction of propagation of emergent light of each of the at least two activated light source components 401 being identical to the direction of propagation of a reference wave corresponding to a sub-hologram in the composite hologram to be loaded.

By taking the holographic display device reproducing sub-holograms in the second composite hologram as example, as shown in FIG. 6b, the controller 30 activates, according to the acquired angle φ, one light source component 401a so that the included angle between the direction of propagation of the emergent light of the light source component 401a and the light incoming surface 101 of the spatial light modulator 10 is the angle φ. In this way, the direction of propagation of the emergent light of the light source component 401a is identical to the direction of propagation of the reference wave of the third sub-hologram 203, and the third sub-hologram 203 can thus be reproduced. In addition, the controller 30 activates, according to the acquired angle θ, the other light source component 401b so that the included angle between the direction of propagation of the emergent light of the light source component 401b and the light incoming surface 101 of the spatial light modulator 10 is the angle θ. In this way, the direction of propagation of the emergent light of the light source component 401b is identical to the direction of propagation of the reference wave of the fourth sub-hologram 204, and the fourth sub-hologram 204 can thus be reproduced.

In a situation that the sub-holograms superposed in the second composite hologram are different from the sub-holograms superposed in the first composite hologram, only some of light source components 401 in the light source 40 can be activated by the controller 30 to reproduce the sub-holograms in the second composite hologram. Similarly, multiple composite holograms can be displayed by the above control method. The specific process is as described above and will not be repeated here.

It should be understood by a person of ordinary skill in the art that, all or part of steps for implementing the method embodiments can be implemented by program instruction related hardware. The programs can be stored in a computer-readable storage medium, and implement, when executed, the steps of the method embodiments. The storage medium includes: an ROM, an RAM, a magnetic disk, an optical disk or other mediums capable of storing program codes.

Figure 10:
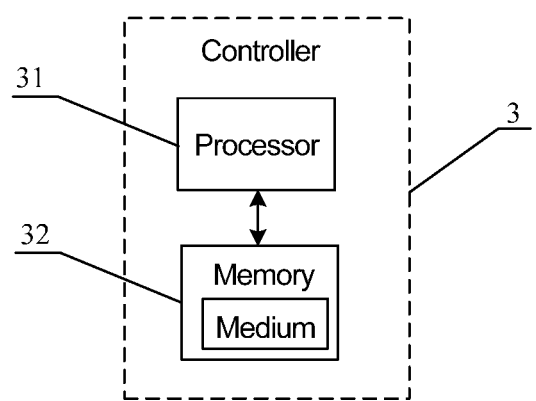
FIG. 10 is a structure diagram of a controller for a holographic display device according to an embodiment of the present disclosure.

As shown in FIG. 10, an embodiment of the present disclosure further provides a controller for the holographic display device described above, including a processor 31 and a memory 31, wherein the memory 32 is configured to store at least one composite hologram, one of the at least one composite hologram being formed by superposing N sub-holograms; and, the processor 31 is configured to control the M light source components so that the direction of propagation of emergent light of each of at least two light source components among the M light source components is identical to the direction of propagation of a reference wave corresponding to one of the N different sub-holograms. Referring to FIG. 2, the processor 31 may be further configured to address each pixel unit 111 of the spatial light modulator 10 and write holographic data of the at least one composite hologram into the spatial light modulator 111 so that the spatial light modulator 10 can load the at least one composite hologram. When the spatial light modulator 10 loads a composite hologram, the processor 31 is configured to acquire the direction of propagation of a reference wave corresponding to each sub-hologram in the composite hologram to be loaded; and then, the processor 31 controls, according to the result of acquisition, the M light source composites so that the direction of propagation of emergent light of each light source component among the M light source components is identical to the direction of propagation of a reference wave corresponding to a sub-hologram. In this way, each sub-hologram in the composite hologram can be reproduced by the readout light emitted from the corresponding light source component 401 in the light source 40.

An embodiment of the present disclosure further provides a non-transient computer-readable storage medium having stored thereon computer programs which, after loaded to a processor and when executed by the processor, implement the following steps of:

loading at least one composite hologram by a spatial light modulator; and providing, by a light source, readout light to the spatial light modulator, wherein the direction of propagation of emergent light of each of at least two light source components in the light source is identical to the direction of propagation of a reference wave corresponding to a different sub-hologram of one of the at least one composite hologram.

An embodiment of the present disclosure further provides a computer program product that, when executed by a processor, implements the following steps of:

loading at least one composite hologram by a spatial light modulator; and providing, by a light source, readout light to the spatial light modulator, wherein the direction of propagation of emergent light of each of at least two light source components in the light source is identical to the direction of propagation of a reference wave corresponding to a different sub-hologram of one of the at least one composite hologram.

The steps in the methods or algorithms described in the embodiments of the present disclosure can be implemented by executing software instructions by a processor. The software instructions can be composed of corresponding software modules. The software modules can be stored in a random access memory (RAM), a flash memory, a read only memory (ROM), an erasable programmable ROM (EPROM), an electrically EPROM (EEPROM), a register, a hard disk, a mobile hard disk, a CD-ROM or any storage mediums in other forms known in the art. An exemplary storage medium is coupled to the process so that the processor can read information from the storage medium and can write information into the storage medium. The processor can be a central processing unit (CPU), a field programmable gate array (FPGA), a micro controller unit (MCU), an application specific integrated circuit (AIC) or other devices having logic operation capacity and/or program execution capacity.

Those skilled in the art should understand that, in one or more examples, the functions described in the present application can be implemented by hardware, software, firmware or any combination thereof. When implemented by software, the functions can be stored in a computer-readable medium or transmitted as one or more instructions or codes in the computer-readable medium. The computer-readable medium includes a computer storage medium and a communication medium, wherein the communication medium includes any medium facilitating the transmission of computer programs from one place to another. The storage medium can be any available medium which can be accessed by a general-purpose or special-purpose computer. In the embodiments of the present disclosure, during the communication of data, information and the like, the communication can be directly or indirectly realized by network connection. For example, the network can include wireless networks, wired networks and/or any combination thereof. The network can include local area networks, Internet, telecom networks, Internet of things based on Internet and/or telecom networks, and/or any combination thereof. The wired networks can realize communication by a wristed pair, a coaxial cable, optical fiber or in other transmission ways, for example; and the wireless networks can realize communication by 3G/4G/5G mobile communication network, Bluetooth, Zigbee, WiFi or the like, for example.

The foregoing descriptions merely show specific implementations of the present disclosure, and the protection scope of the present disclosure is not limited thereto. Any person of skill in the art can readily conceive of variations or replacements within the technical scope disclosed by the embodiments of the present disclosure, and these variations or replacements shall fall into the protection scope of the present disclosure. Accordingly, the protection scope of the present disclosure shall be subject to the protection scope of the claims.

What is claimed is:

1. A holographic display device, comprising:
a spatial light modulator being configured to load at least one composite hologram, and one of the at least one composite hologram being formed by superposing N sub-holograms; and
a light source arranged on a light incoming side of the spatial light modulator, the light source being configured to provide readout light to the spatial light modulator;
wherein the light source comprises M light source components, a direction of propagation of emergent light of each of at least two light source components among the M light source components is identical to a direction of propagation of a reference wave corresponding to one of the N sub-holograms, and M≥N≥2, and M and N are positive integers, and
a driver and a controller having the at least one composite hologram stored therein;
wherein the controller is connected to the driver, and the controller is configured to acquire, from the at least one composite hologram, the direction of propagation of a reference wave corresponding to each sub-hologram in a composite hologram to be loaded and transmit a deflecting instruction to the driver according to the result of acquisition;
wherein the driver is connected to each of the M light source components, and the driver is configured to drive, according to the deflecting instruction, the M light source components to deflect so that the direction of propagation of emergent light of each of the at least two light source components is identical to the direction of propagation of a reference wave corresponding to one of the M sub-holograms.

2. The holographic display device according to claim 1, wherein,
the M light source components are arranged on the light incoming side of the spatial light modulator, the direction of propagation of the emergent light of each of the M light source components is different, and each of the M light source components is used for reproducing a corresponding sub-hologram in the at least one composite hologram, respectively.

3. The holographic display device according to claim 2, wherein,
the at least two light source components are arranged successively and densely, and an included angle between the directions of propagation of emergent light of any two adjacent light source components in the at least two light source components is an acute angle.

4. The holographic display device according to claim 3, wherein, in a situation that there are multiple included angles, the multiple included angles are equal.

5. The holographic display device according to claim 2, wherein, the light source completely covers a light incoming surface of the spatial light modulator.

6. The holographic display device according to claim 1, wherein,
the controller is connected to the spatial light modulator, and the controller is configured to address each pixel unit of the spatial light modulator and write holographic data of the at least one composite hologram into the spatial light modulator.

7. The holographic display device according to claim 1, wherein at least one of the M light source components comprises a laser and a collimating beam expander arranged on a light outgoing side of the laser.

8. The holographic display device according to claim 1, wherein at least one of the M light source components comprises an LED light source.

9. A display cabinet, comprising the holographic display device according to claim 1.

10. A method for driving the holographic display device according to claim 1, comprising the steps of:
loading at least one composite hologram by a spatial light modulator; and
providing, by a light source, readout light to the spatial light modulator, wherein the direction of propagation of emergent light of each of at least two light source components in the light source is identical to the direction of propagation of a reference wave corresponding to a sub-hologram in one of the at least one composite hologram,
wherein, the step of providing, by a light source, readout light to the spatial light modulator comprises:
storing at least one composite hologram by the controller;
acquiring, by the controller and from the at least one composite hologram, the direction of propagation of a reference wave corresponding to each sub-hologram in a composite hologram to be loaded, and transmitting a deflecting instruction to the driver according to the result of acquisition; and
driving, by the driver and according to the deflecting instruction, the M light source components to deflect so that the direction of propagation of emergent light of each of at least two light source components among the M light source components is identical to the direction of propagation of a reference wave corresponding to a corresponding sub-hologram in the composite hologram to be loaded.

11. The method for driving a holographic display device according to claim 10, wherein the step of loading at least one composite hologram by a spatial light modulator comprises:
addressing, by the controller, each pixel unit of the spatial light modulator, and writing holographic data of the at least one composite hologram into the spatial light modulator.

12. A non-transient computer-readable storage medium having stored thereon computer programs which, after loaded to a processor and when executed by the processor, implement the control method according to claim 10.

13. A computer program product that, when executed by a processor, implements the control method according to claim 10.

14. A controller for the holographic display device according to claim 1, comprising a processor and a memory, wherein,
the memory is configured to store at least one composite hologram, one of the at least one composite hologram being formed by superposing N sub-holograms; and,
the processor is configured to control the M light source components so that the direction of propagation of emergent light of each of at least two light source components among the M light source components is identical to the direction of propagation of a reference wave corresponding to one of the N different sub-holograms.

15. A holographic display device, comprising:
a spatial light modulator being configured to load at least one composite hologram, and one of the at least one composite hologram being formed by superposing N sub-holograms; and
a light source arranged on a light incoming side of the spatial light modulator, the light source being configured to provide readout light to the spatial light modulator; wherein the light source comprises M light source components, a direction of propagation of emergent light of each of at least two light source components among the M light source components is identical to a direction of propagation of a reference wave corresponding to one of the N sub-holograms, and M≥N≥2, and M and N are positive integers;
a controller having the at least one composite hologram stored therein;
wherein the M light source components are arranged on the light incoming side of the spatial light modulator, the direction of propagation of the emergent light of each of the M light source components is different, and each of the M light source components is used for reproducing a corresponding sub-hologram in the at least one composite hologram, respectively;
wherein the controller is connected to each of the M light source components, and the controller is configured to acquire, from the at least one composite hologram, the direction of propagation of a reference wave corresponding to each sub-hologram in a composite hologram to be loaded and activate, according to the result of acquisition, some of the M light source components; and, the direction of propagation of emergent light of each of the at least two activated light source components among the M light source components is identical to the direction of propagation of a reference wave corresponding to a sub-hologram in the composite hologram to be loaded.

16. The holographic display device according to claim 15, wherein,
the at least two light source components are arranged successively and densely, and an included angle between the directions of propagation of emergent light of any two adjacent light source components in the at least two light source components is an acute angle.

17. The holographic display device according to claim 16, wherein, in a situation that there are multiple included angles, the multiple included angles are equal.

18. The holographic display device according to claim 15, wherein, the light source completely covers a light incoming surface of the spatial light modulator.

19. A display cabinet, comprising the holographic display device according to claim 15.

20. A method for driving the holographic display device according to claim 15, comprising the steps of:
loading at least one composite hologram by a spatial light modulator; and
providing, by a light source, readout light to the spatial light modulator, wherein the direction of propagation of emergent light of each of at least two light source components in the light source is identical to the direction of propagation of a reference wave corresponding to a sub-hologram in one of the at least one composite hologram;
wherein, the step of providing, by a light source, readout light to the spatial light modulator comprises:
storing at least one composite hologram by the controller;
acquiring, by the controller and from the at least one composite hologram, the direction of propagation of a reference wave corresponding to each sub-hologram in a composite hologram to be loaded; and
activating, by the controller and according to the result of acquisition, at least two of the M light source components, the direction of propagation of emergent light of each of the at least two activated light source components among the M light source components being identical to the direction of propagation of a reference wave corresponding to a sub-hologram in the composite hologram to be loaded.

* * * * *